Patented Apr. 3, 1951

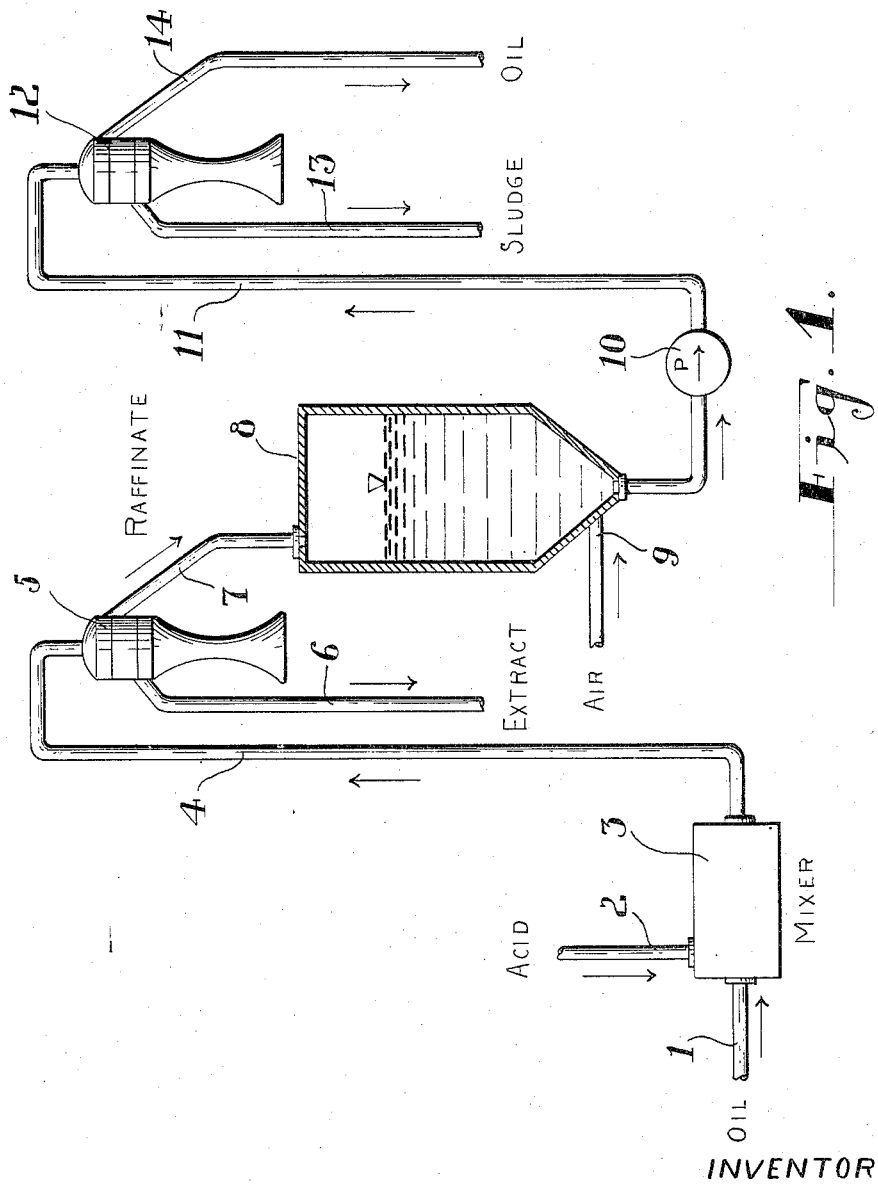

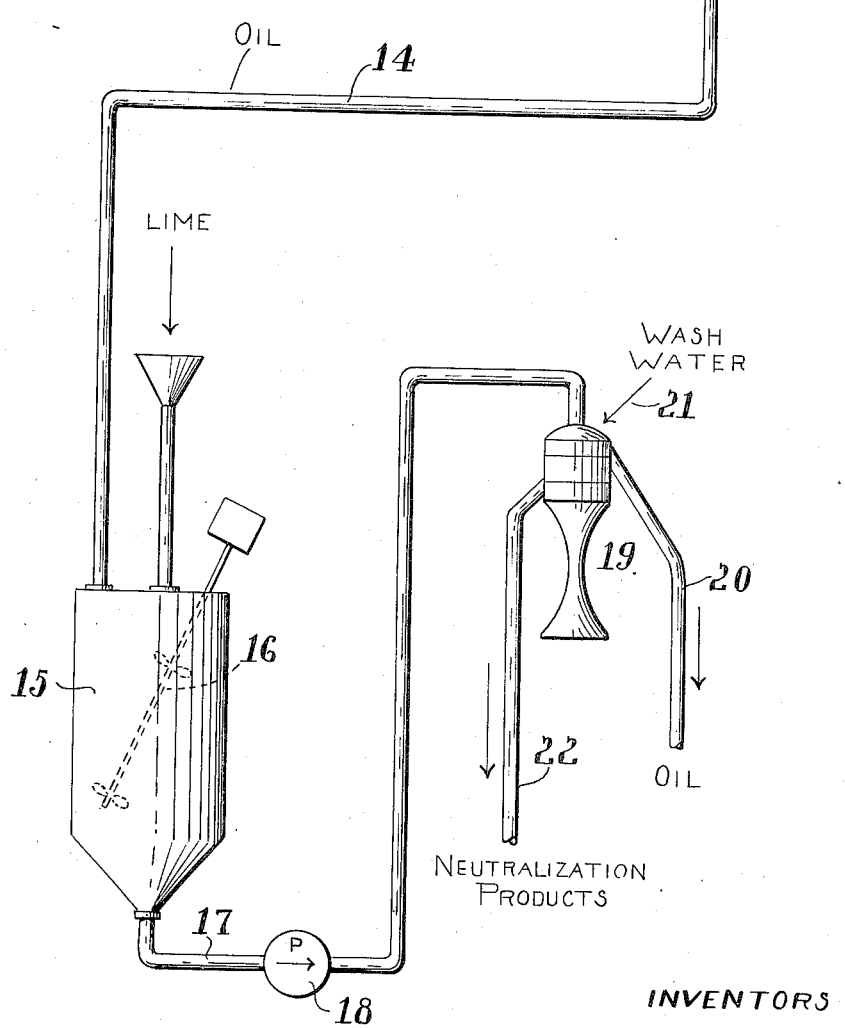

2,547,629

UNITED STATES PATENT OFFICE 2,547,629

PROCESS OF REFINING MINERAL OILS

Bruno Kuno Engel, Hoglandstorget, and Fredrik Teodor Emanuel Palmqvist, Stockholm, Sweden, assignors to Aktiebolaget Separator-Nobel, Stockholm, Sweden, a corporation of Sweden Application October 16, 1946, Serial No. 703,518 In Sweden April 1, 1946

9 Claims. (Cl. 196—40)

The refining of petroleum oils, shale oils, tars and the like, referred to below under the comprehensive denomination of "oils," is effected according to known methods by adding sulphuric acid or some other acid refining agent, removing the acid sludge formed and neutralizing the acid refined product with alkali or with lime and bleaching earth.

It has been found that when treating oils with sulphuric acid, there is primarily a selective extraction of components poor in hydrogen, i. e. such hydrocarbons of an unsaturated or aromatic nature as form a separate phase (the extract phase together with the acid) while the raffinate phase holds the valuable hydrocarbons comparatively rich in hydrogen.

In the exact phase a reaction then takes place between the acid and the components poor in hydrogen, whereby certain sulphonation products are formed which are partly redissolved in the raffinate phase in the course of the reaction. At the same time reaction water is also formed which dilutes the acid and reduces its dissolving power, the extract phase thus generally being split into two separate phases, namely, on one hand so-called free, relatively dilute acid containing the most soluble extracted and reaction products, and on the other hand the products insoluble in the dilute acid (the so-called acid sludge).

As a result of the acid treatment of the oil the following three liquid phases are thus obtained:
1. Raffinate with a relatively high acidity.
2. Acid sludge.
3. Free, dilute acid in which a certain amount of acid sludge is dissolved.

As above stated, the raffinate is neutralized with alkali or, as is nowadays customary, by treatment with lime and bleaching earth. In the latter case the acid components are partly neutralized by the lime and partly adsorbed by the bleaching earth. The higher the acidity of the raffinate, the higher is the consumption of neutralizing agent and the costs of the finished oil. It is therefore of great economic importance to reduce the acidity of the raffinate. We have found that this can be done by centrifugally separating the extract phase from the raffinate phase before any noticeable chemical reaction with subsequent re-dissolution of acid reaction products in the raffinate phase has taken place, and by subsequently subjecting the raffinate phase to a secondary reaction, preferably without any further addition of sulphuric acid, so as to reduce its acidity still further.

The acidity of the separated raffinate phase depends principally on the fact that the sulfuric acid, both as such and mixed with dissolved extract, has a certain solubility also in the raffinate phase. The dissolved acid reacts gradually with certain non-extracted components poor in hydrogen, a precipitation of sludge ("pepper sludge") thereby taking place. If this secondary reaction is brought to an end and the sludge thus formed is removed, e. g. by centrifuging, a raffinate with a very low acidity is obtained. The procedure may, however, be rather slow and tedious. At first the precipitation of sludge is rather rapid, but gradually it proceeds more and more slowly. In certain cases a month or more will thus elapse before a practically complete precipitation of the sludge is attained.

The behavior of the different oils in this respect is, however, very individual. From a stock containing resins or resin-forming substances, a raffinate phase is obtained in which the secondary-reaction as well as the sludge precipitation takes place comparatively quickly because the resinous substances are chemically unstable and act as agglomerating agents.

High-vacuum distillates and solvent raffinates obtained by modern methods behave quite differently, however. They have a very small content of such resins which have an agglomerating effect. According to the present invention the separated raffinate phase is in such cases treated with an agent which promotes sludge-forming and a sludge-agglomerating agent which transforms the finely dispersed sludge ("pepper sludge") formed at the secondary-reaction into such a state that it can be removed by centrifuging without difficulty. This can to advantage be done by blowing with air for such a length of time that no noticeable additional formation of sludge takes place. Simultaneously the finely divided sludge particles agglomerate so that the sludge can then be completely removed by centrifuging. In order to accelerate the agglomeration, some other agglomerating agent may be added, for instance oxides, hydroxides or metal salts, preferably of metals belonging to the first or second group of the periodical system and preferably in the form of water solutions. By the term "sludge agglomerating agent," I mean to denote both an agent which in itself serves to agglomerate sludge and an agent which reacts with an ingredient of the raffinate to promote sludge agglomeration.

Comprehensive investigations have been carried out with acid-treated oils which have been effectively freed from acid sludge either in the ordinary way by (I) centrifuging only, or (II) by re-centrifuging the already centrifuged oil after addition of an agglomerating agent, or (III) by subjecting the centrifugally de-sludged oil to air-blowing until no additional acid sludge is formed, the agglomerated sludge then being removed by centrifuging. From the following table will be seen that considerable advantages are obtained by blowing with air according to the last-mentioned method:

| Method | Acidity | Lime, per cent | Bleach. earth, per cent | Color Saybolt | Color Saybolt after stability | Neutralization loss, per cent |
|---|---|---|---|---|---|---|
| ENGINE OIL (246 SEC. S. AT 130° F.) | | | | | | |
| I | 1.4 | 0.3 | 2.5 | 3 | 3.5 | 2.7 |
| II | 0.9 | 0.3 | 2.0 | 3– | 3.5– | 2.2 |
| III | 0.3 | 0.9 | | 2.5 | 3.0 | 0.6 |
| SPINDLE OIL (35 SEC. S. AT 130° F.) | | | | | | |
| I | 1.1 | 0.3 | 1.5 | 1.5+ | 2 | 1.6 |
| II | 0.6 | 0.3 | 1.2 | 1.5+ | 2 | 1.3 |
| III | 0.2 | 0.6 | | 1.5 | 2– | 0.4 |

It will be seen from the table that air blown and centrifuged oil does not require any treatment with bleaching earth to get the required color and color stability. Lime treatment only is sufficient, which is important as lime is much cheaper than bleaching earth. Neutralization costs as well as losses will be considerably lower. Furthermore, it has been found that the neutralization products obtained by neutralizing with lime can be continuously removed in centrifuges, which is not the case when both lime and bleaching earth have been used. If water is introduced at a suitable point in the centrifuge bowl, as a washing medium in this final centrifugation step, the neutralization products are obtained practically oil-free which means a further reduction of the oil losses.

By removing the extract phase, according to the invention, before any noticeable chemical reaction has taken place between the acid and the components poor in hydrogen, and then in a second stage of treatment, letting the acid dissolved in the raffinate phase react with the non-extracted components poor in hydrogen and at the same time blowing air through the raffinate, formation of the aforementioned third liquid phase (free dilute acid) in either stage is avoided, which in turn facilitates the continuous separation in centrifuges. At the same time the acid is practically fully utilized.

Figs. 1 and 2 of the accompanying drawings show schematically a type of plant for refining oil according to the invention.

The charge stock is continuously introduced through the pipe 1, and the amount of acid required is fed through the pipe 2 into the mixer 3 where the acid is finely dispersed in the oil. The mixer 3 and the pipe 4 are of such dimensions that the time required for the extraction of the oil components poor in hydrogen (as a rule 2 to 5 minutes) elapses, before the mixture is fed into the centrifuge 5, wherein the extract phase is separated from the raffinate phase and is discharged through the pipe 6. The raffinate phase flows through the pipe 7 to the reaction tank 8 in which a liquid level is maintained corresponding to the time necessary for the secondary reaction, which may vary between, for instance, ½ and 10 hours according to the speed of precipitation and agglomeration of the sludge. Compressed air may be introduced into the tank 8 through the pipe 9.

From the bottom of the tank 8 the mixture is taken by the pump 10 through the pipe 11 into the centrifuge 12 whence the separated sludge is discharged through the pipe 13, whereas the raffinate is taken through the pipe 14 to the final treatment with, for instance, lime, or lime and bleaching earth, in the tank 15 (see Fig. 2). An intimate mixture is maintained in tank 15 by means of stirrer 16 and conducted by means of pipe 17 and pump 18 to the centrifuge 19 from which the final oil product is discharged through pipe 20. Wash water is introduced in the centrifuge bowl by means of pipe 21. The neutralization products are discharged from pipe 22.

The mixing equipment 3 may consist of one or more centrifugal pumps connected in series, as well as pipe coils and/or columns. The tank 8 should preferably be lagged and provided with steam-heated bottom and an arrangement for automatically maintaining the desired liquid level.

In the foregoing table, we have referred to "engine oil" and "spindle oil," which are well-known lubricating oils.

What we claim and desire to protect by Letters Patent is:

1. The process of refining lubricating oils, which comprises continuously introducing, in a primary step, fresh concentrated sulphuric acid into a stream of oil to be refined, extracting by means of said acid the more unstable components of the oil with subsequent formation of a centrifugal acid phase, substantially inhibiting water-yielding reactions between the acid and said components by passing the oil and acid solution, after an extraction period in the order of 2 to 5 minutes but before any noticeable chemical reaction with subsequent re-dissolution of acid reaction products in the raffinate phase has taken place, through a locus of centrifugal force to separate the mixture into two phases, one of which is a pre-refined oil product containing dissolved and non-reacted sulphuric acid, whereas the other is a solution of said more unstable products of the oil in sulphuric acid, subjecting said pre-refined oil to a secondary refining action by chemical reaction with the acid contained in it, and separating the reaction products by centrifuging.

2. A process according to claim 1, in which the secondary refining action takes place in the presence of an agent which promotes the conversion of sludge-forming constituents in the oil to sludge, the sludge thus formed being separated by centrifuging.

3. A process according to claim 1 in which the secondary refining action takes place in the presence of a sludge-agglomerating agent, the sludge thus agglomerated being separated by centrifuging.

4. A process according to claim 1, in which after the secondary refining action the oil is treated with a solid neutralizing agent, and in which the neutralization products are removed from the oil in a locus of centrifugal force while introducing water into said last locus.

5. The process of refining lubricating oils, which comprises continuously introducing, in a primary step, fresh concentrated sulphuric acid into a stream of oil to be refined, intimately mixing said oil with said sulphuric acid to extract the more unstable components of the oil, centrifugally separating said mixture into an acid-containing raffinate phase and an extract phase before any noticeable water-yielding chemical reaction between said acid and oil with subsequent re-dissolution of acid reaction products in the raffinate phase has taken place, allowing, in a secondary step, the free acid of the acid-containing raffinate phase to react with the more stable reactive components therein, to produce a separable acid sludge, and separating said acid sludge from the raffinate phase by centrifuging.

6. A process according to claim 5, in which the secondary refining step is carried out in the presence of an agent which promotes the reaction of the free acid in the acid-containing raffinate with the more stable reactive components therein.

7. A process according to claim 5, in which air is blown through the acid-containing raffinate in the secondary refining step to promote the reaction between the free acid and the more stable reactive components of the raffinate and the formation of a separable acid sludge.

8. A process as claimed in claim 5, in which the secondary refining step is carried out in the presence of a sludge-agglomerating agent selected from the group which consists of oxides, hydroxides and salts of metals pertaining to the first and second groups of the periodical system.

9. A process according to claim 5, in which the raffinate obtained in the secondary step is treated, in a third step, with a solid neutralizing agent, and in which the neutralization products are removed from the raffinate in a locus of centrifugal force while introducing water into said last locus.

BRUNO KUNO ENGEL.
FREDRIK TEODOR EMANUEL PALMQVIST.

REFERENCES CITED

The following references are of record in the file of this patent:

UNITED STATES PATENTS

| Number | Name | Date |
|---|---|---|
| 1,575,116 | Jones | Mar. 2, 1926 |
| 1,621,475 | Cross | Mar. 15, 1927 |
| 1,736,018 | Stratford | Nov. 19, 1929 |
| 2,261,206 | Archibald | Nov. 4, 1941 |
| 2,279,461 | Hene | Apr. 14, 1942 |
| 2,282,033 | Chechot | May 5, 1942 |
| 2,348,609 | Cohen | May 9, 1944 |
| 2,361,787 | Musselman | Oct. 31, 1944 |
| 2,399,140 | Peters et al. | Apr. 23, 1946 |
| 2,400,298 | Jones et al. | May 14, 1946 |

FOREIGN PATENTS

| Number | Country | Date |
|---|---|---|
| 527,609 | Great Britain | Oct. 11, 1940 |